(12) United States Patent
Asada et al.

(10) Patent No.: US 8,925,410 B2
(45) Date of Patent: Jan. 6, 2015

(54) SYNCHRONIZER FOR TRANSMISSION

(71) Applicant: Honda Motor Co., Ltd., Tokyo (JP)

(72) Inventors: Hisayuki Asada, Wako (JP); Yasuyuki Masaoka, Wako (JP); Hiromichi Konishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 13/771,088

(22) Filed: Feb. 20, 2013

(65) Prior Publication Data

US 2013/0239718 A1 Sep. 19, 2013

(30) Foreign Application Priority Data

Mar. 19, 2012 (JP) ................... 2012-061644

(51) Int. Cl.
- *F16H 3/38* (2006.01)
- *F16D 13/00* (2006.01)
- *F16H 3/083* (2006.01)
- *F16D 23/06* (2006.01)

(52) U.S. Cl.
CPC ............... *F16H 3/083* (2013.01); *F16D 23/06* (2013.01); *F16D 2023/0631* (2013.01); *F16D 2023/0637* (2013.01)
USPC ........................................ 74/339; 192/53.31

(58) Field of Classification Search
USPC .................. 74/339, 340; 192/53.31, 53.32
See application file for complete search history.

(56) References Cited

U.S. PATENT DOCUMENTS

| | | | | |
|---|---|---|---|---|
| 4,776,228 A | * | 10/1988 | Razzacki et al. ................. | 74/339 |
| 5,695,033 A | * | 12/1997 | Hiraiwa ..................... | 192/53.32 |
| 6,739,443 B2 | * | 5/2004 | Fernandez ............... | 192/53.341 |
| 8,800,401 B2 | * | 8/2014 | Wagner ........................... | 74/339 |

FOREIGN PATENT DOCUMENTS

JP 2724742 B2 10/1990

* cited by examiner

*Primary Examiner* — Ha D Ho
(74) *Attorney, Agent, or Firm* — Mori & Ward, LLP

(57) ABSTRACT

A synchronizer for a transmission includes a shift rail, a first sleeve, a second sleeve, and a stopper. The shift rail includes a first shift fork and a second shift fork that are provided integrally with each other. The first sleeve is movable in a first direction along an axial direction from a predetermined first standby position to synchronize a first gear with a rotating shaft. The second sleeve is movable in a second direction along the axial direction from a predetermined second standby position to synchronize a second gear with the rotating shaft. A distance between the second sleeve at the predetermined second standby position and the stopper in the axial direction is smaller than a distance between the first sleeve at the predetermined first standby position and the third gear in the axial direction.

5 Claims, 7 Drawing Sheets

SYNCHRONIZER FOR TRANSMISSION

CROSS-REFERENCE TO RELATED APPLICATIONS

The present application claims priority under 35 U.S.C. §119 to Japanese Patent Application No. 2012-061644, filed Mar. 19, 2012, entitled "Synchronizer for Transmission." The contents of this application are incorporated herein by reference in their entirety.

BACKGROUND OF THE INVENTION

1. Field of the Invention

The present disclosure relates to a synchronizer for a transmission.

2. Discussion of the Background

This type of synchronizer for a transmission generally includes a hub that is fixed to a rotating shaft and that has a plurality of spline teeth on an outer periphery thereof, a sleeve that has a plurality of spline teeth on an inner periphery thereof and that is splined to the hub, and a blocking ring that has spline teeth on an outer periphery thereof and that has a conical surface that engages with a conical surface of the gear. To set a gear position, the sleeve is driven by a shift rail so that the blocking ring is pushed toward the gear. Accordingly, the conical surfaces of the blocking ring and the gear come into contact with each other so that a frictional force is generated which synchronizes the gear with the rotating shaft. In this state, the spline teeth of the sleeve mesh with the spline teeth of the blocking ring and dog teeth of the gear, thereby a gear position is set.

In such a synchronizer, in the case where the gear has a small diameter and meshes with another gear, an end of the sleeve moved to synchronize the gear with the rotating shaft may come into contact with a side surface of the other gear. In such a case, if there is a differential rotation between the gears, there is a risk that contact portions of the sleeve and the other gear will wear unevenly or become damaged.

Japanese Patent No. 2724742, for example, discloses a synchronizer including a sleeve that is provided with a stopper that regulates the movement thereof to solve the above-described problem. The synchronizer includes a retaining portion that is formed integrally with gear-side end portions of two adjacent spline teeth of a hub so as to connect the end portions. The spline tooth of the sleeve that corresponds to the retaining portion is cut so that only an end portion at the end opposite the retaining portion remains, and the remaining end portion serves as an engagement portion. When the sleeve moves toward the gear, the engagement portion of the sleeve comes into contact with the retaining portion of the hub so that the movement of the sleeve is stopped and the above-described problem does not occur.

SUMMARY OF THE INVENTION

According to one aspect of the present invention, a synchronizer for a transmission includes a shift rail, a first sleeve, a second sleeve, and a stopper. The shift rail includes a first shift fork and a second shift fork that are provided integrally with each other. The shift rail is movable in an axial direction of a rotating shaft supporting a first gear, a second gear, and a third gear to be rotatable with respect to the rotating shaft. The first sleeve engages with the first shift fork to be driven by the shift rail through the first shift fork. The first sleeve is movable in a first direction along the axial direction from a predetermined first standby position to synchronize the first gear with the rotating shaft. The first sleeve is arranged to face the third gear in the axial direction. The second sleeve engages with the second shift fork to be driven by the shift rail through the second shift fork. The second sleeve is movable in a second direction along the axial direction from a predetermined second standby position to synchronize the second gear with the rotating shaft. The second direction is opposite to the first direction. The stopper is contactable with the second sleeve to regulate movement of the second sleeve. A distance between the second sleeve at the predetermined second standby position and the stopper in the axial direction is smaller than a distance between the first sleeve at the predetermined first standby position and the third gear in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
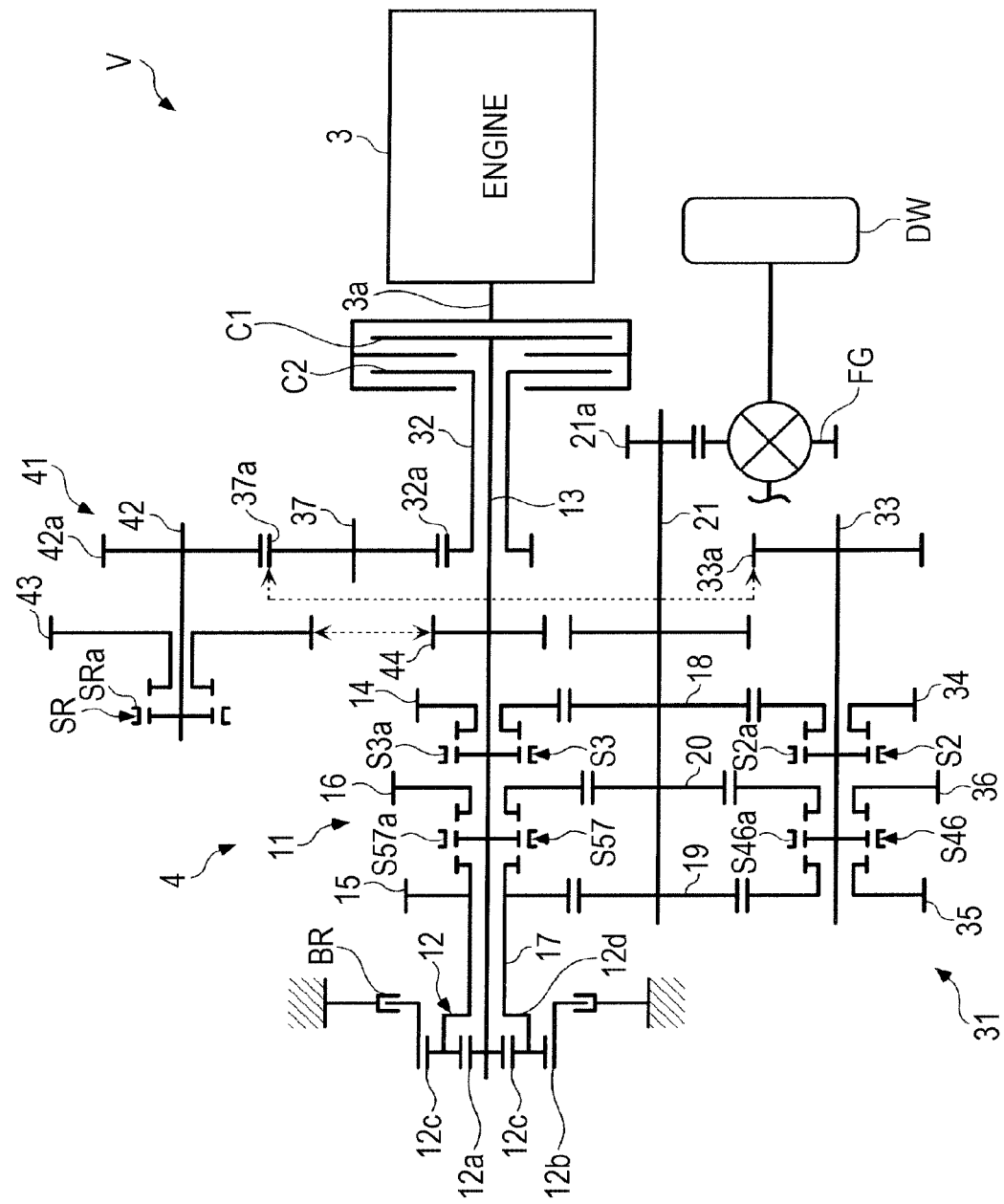
FIG. 1 is a schematic diagram illustrating a vehicle in which a transmission including a synchronizer according to an embodiment of the present disclosure is mounted.

The embodiments will now be described with reference to the accompanying drawings, wherein like reference numerals designate corresponding or identical elements throughout the various drawings.

A vehicle V illustrated in FIG. 1 is a four-wheel vehicle including an internal combustion engine (hereinafter referred to as an "engine") 3, a transmission 4 that transmits the power of the engine 3, left and right driving wheels DW (only one of them is illustrated) driven by the power transmitted by the transmission 4, and driven wheels (not shown).

The transmission 4 is a dual-clutch transmission in which a first transmission mechanism 11 and a second transmission mechanism 31 are arranged next to each other. The first transmission mechanism 11 transmits the power of the engine 3 with the gear position set to an odd-numbered (first, third, fifth, or seventh) gear position. The second transmission mechanism 31 transmits the power of the engine 3 with the gear position set to an even-numbered (second, fourth, or sixth) gear positions.

The first transmission mechanism 11 includes a first clutch C1, a planetary gear train 12, a first input shaft 13, a third-speed drive gear 14, a fifth-speed drive gear 15, and a seventh-speed drive gear 16.

The first clutch C1 connects and disconnects a crankshaft 3a to and from the first input shaft 13. The planetary gear train 12 includes a sun gear 12a, a ring gear 12b that surrounds the sun gear 12a, a plurality of planet gears 12c (only two are illustrated) that mesh with the gears 12a and 12b, and a carrier 12d that supports the planet gears 12c in a rotatable manner.

The sun gear 12a is integrally connected to an end of the first input shaft 13. The ring gear 12b is provided with a lock mechanism BR that locks the ring gear 12b. The carrier 12d is integrally connected to a hollow rotating shaft 17 that is coaxially and rotatably arranged around the first input shaft 13.

The fifth-speed drive gear 15, the seventh-speed drive gear 16, and the third-speed drive gear 14 are arranged in that order from the planetary-gear-train-12 side. The fifth-speed drive gear 15 is formed integrally with the rotating shaft 17. The third-speed drive gear 14 and the seventh-speed drive gear 16 are rotatably supported by the first input shaft 13.

A third-speed synchronizing mechanism S3 and a fifth-speed/seventh-speed synchronizing mechanism S57 are provided on the first input shaft 13. The third-speed synchronizing mechanism S3 is disposed near the third-speed drive gear 14 on the seventh-speed-drive-gear-16 side of the third-speed drive gear 14. The third-speed synchronizing mechanism S3 includes a sleeve S3a that is moved toward the third-speed drive gear 14 by a third-speed shift rail (not shown) so that the third-speed drive gear 14 is synchronized with and locked to the first input shaft 13. The fifth-speed/seventh-speed synchronizing mechanism S57 is disposed between the fifth-speed drive gear 15 and the seventh-speed drive gear 16, and includes a sleeve S57a that is moved by a fifth-speed/seventh-speed shift rail (not shown) so that the fifth-speed drive gear 15 or the seventh-speed drive gear 16 is selectively synchronized with and locked to the first input shaft 13.

The third-speed drive gear 14, the fifth-speed drive gear 15, and the seventh-speed drive gear 16 respectively mesh with a second-speed/third-speed driven gear 18, a fourth-speed/fifth-speed driven gear 19, and a sixth-speed/seventh-speed driven gear 20 that are formed integrally with an output shaft 21. The output shaft 21 has a gear 21a formed integrally therewith at one end thereof, and is connected to each driving wheel DW with the gear 21a and a final gear FG, provided with a differential device, interposed therebetween.

With the above-described structure, when the ring gear 12b is locked by the lock mechanism BR and the third-speed, fifth-speed, and seventh-speed drive gears 14 to 16 are released from the third-speed and fifth-speed/seventh-speed synchronizing mechanisms S3 and S57, the transmission 4 is set to the speed gear position by the planetary gear train 12, the fifth-speed drive gear 15, and the fourth-speed/fifth-speed driven gear 19.

When the ring gear 12b is released from the lock mechanism BR and one of the third-speed, fifth-speed, and seventh-speed drive gears 14 to 16 is synchronized with and locked to the first input shaft 13 by the third-speed or fifth-speed/seventh-speed synchronizing mechanism S3 or S57, the transmission 4 is set to the third, fifth, or seventh gear position by one of the third-speed, fifth-speed, and seventh-speed drive gears 14 to 16 that is locked and one of the second-speed/third-speed, fourth-speed/fifth-speed, and sixth-speed/seventh-speed driven gears 18 to 20 that meshes with the locked drive gear. When the first clutch C1 is engaged while an odd-numbered gear position is set as described above, the power of the engine 3 is transmitted to the first input shaft 13, output to the output shaft 21 after a speed change corresponding to the set gear position, and then transmitted to each driving wheel DW.

The second transmission mechanism 31 includes a second clutch C2, a second input shaft 32, a second input sub-shaft 33, a second-speed drive gear 34, a fourth-speed drive gear 35, and a sixth-speed drive gear 36.

The second clutch C2 connects and disconnects the crankshaft 3a to and from the second input shaft 32. The second input shaft 32 is hollow and is coaxially and rotatably arranged around the first input shaft 13. The second input shaft 32 has a gear 32a formed integrally therewith at one end thereof. The gear 32a meshes with an idler gear 37a that is formed integrally with an idler shaft 37.

The second input sub-shaft 33 has a gear 33a formed integrally therewith. The gear 33a meshes with the idler gear 37a. Thus, the second input shaft 32 is connected to the second input sub-shaft 33 by the gear 32a, the idler gear 37a, and the gear 33a.

The fourth-speed drive gear 35, the sixth-speed drive gear 36, and the second-speed drive gear 34 are arranged in that order from the planetary-gear-train-12 side, and are rotatably supported by the second input sub-shaft 33. The fourth-speed drive gear 35, the sixth-speed drive gear 36, and the second-speed drive gear 34 respectively mesh with the fourth-speed/fifth-speed driven gear 19, the sixth-speed/seventh-speed driven gear 20, and the second-speed/third-speed driven gear 18.

A second-speed synchronizing mechanism S2 and a fourth-speed/sixth-speed synchronizing mechanism S46 are provided on the second input sub-shaft 33. The second-speed synchronizing mechanism S2 is disposed near the second-speed drive gear 34 on the sixth-speed-drive-gear-36 side of the second-speed drive gear 34. The second-speed synchronizing mechanism S2 includes a sleeve S2a that is moved toward the second-speed drive gear 34 by a second-speed/reverse shift rail 51 (see FIG. 2) so that the second-speed drive gear 34 is synchronized with and locked to the second input sub-shaft 33. The fourth-speed/sixth-speed synchronizing mechanism S46 is disposed between the fourth-speed drive gear 35 and the sixth-speed drive gear 36, and includes a sleeve S46a that is moved by a fourth-speed/sixth-speed shift rail (not shown) so that the fourth-speed drive gear 35 or the sixth-speed drive gear 36 is selectively synchronized with and locked to the second input sub-shaft 33.

With the above-described structure, when one of the second-speed, fourth-speed, and sixth-speed drive gears 34 to 36 is synchronized with and locked to the second input sub-shaft 33 by the second-speed or fourth-speed/sixth-speed synchronizing mechanism S2 or S46, the transmission 4 is set to the second, fourth, or sixth gear position by one of the second-speed, fourth-speed, and sixth-speed drive gears 34 to 36 that is locked and one of the second-speed/third-speed, fourth-speed/fifth-speed, and sixth-speed/seventh-speed driven gears 18 to 20 that meshes with the locked drive gear. When the second clutch C2 is engaged while an even-numbered gear position is set as described above, the power of the engine 3 is transmitted from the second input shaft 32 to the second input sub-shaft 33, output to the output shaft 21 after a speed change corresponding to the set gear position, and then transmitted to each driving wheel DW.

The transmission 4 includes a reverse mechanism 41 used when the vehicle moves in the reverse direction. The reverse mechanism 41 includes a reverse shaft 42 having a gear 42a that is formed integrally with the reverse shaft 42 and that meshes with the idler gear 37a; a reverse drive gear 43 that is rotatably supported by the reverse shaft 42; a reverse driven gear 44 that is formed integrally with the first input shaft 13 and that meshes with the reverse drive gear 43; and a reverse synchronizing mechanism SR provided on the reverse shaft 42.

The reverse synchronizing mechanism SR includes a sleeve SRa that is moved by the second-speed/reverse shift rail 51 so that the reverse drive gear 43 is synchronized with and locked to the reverse shaft 42. When the reverse drive gear 43 is locked as described above, the power that is transmitted from the second input shaft 32 to the reverse shaft 42 through the idler gear 37a is further transmitted to the first input shaft 13 through the reverse drive gear 43 and the reverse driven gear 44, so that the first input shaft 13 is rotated in the reverse direction. As a result, the vehicle is moved in the reverse direction.

The second-speed synchronizing mechanism S2 and the reverse synchronizing mechanism SR included in the above-described structure will now be described. As described above, the sleeve S2a of the second-speed synchronizing mechanism S2 and the sleeve SRa of the reverse synchronizing mechanism SR are driven by the second-speed/reverse shift rail 51.

Figure 2:
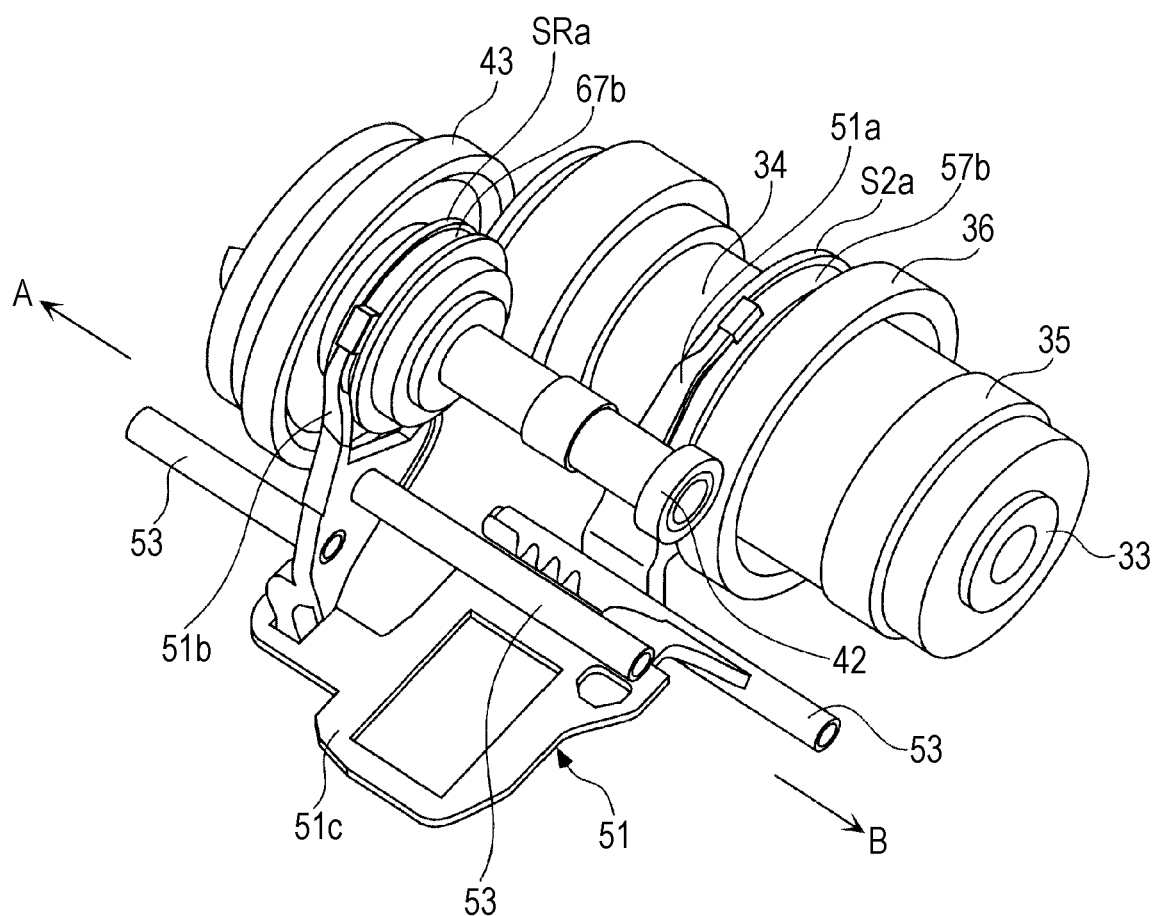
FIG. 2 is a perspective view illustrating the structure around a second input sub-shaft and a reverse shaft and a shift rail in the transmission.

As illustrated in FIG. 2, the shift rail 51 includes a first shift fork 51a and a second shift fork 51b that are connected to each other by a connecting portion 51c. The shift forks 51a and 51b have a semicircular shape and are arranged on different axial lines. The first shift fork 51a engages with the sleeve S2a provided on the second input sub-shaft 33. The second shift fork 51b engages with the sleeve SRa provided on the reverse shaft 42.

Three shift fork rods 53 that are parallel to, for example, the second input sub-shaft 33 are formed integrally with the shift rail 51. The shift rail 51 can be driven by an actuator (not shown) in the opposite directions along the axis of the second input sub-shaft 33.

More specifically, when the shift rail 51 is moved in the direction of arrow A in FIG. 2 from a neutral position thereof, the sleeve S2a is moved in the same direction. Accordingly, the second-speed drive gear 34 is synchronized with and locked to the second input sub-shaft 33, as described below. When the shift rail 51 is moved in the direction of arrow B, which is opposite to the direction of arrow A, from the neutral position thereof, the sleeve SRa is moved in the same direction. Accordingly, the reverse drive gear 43 is synchronized with and locked to the reverse shaft 42, as described below.

Figure 3:
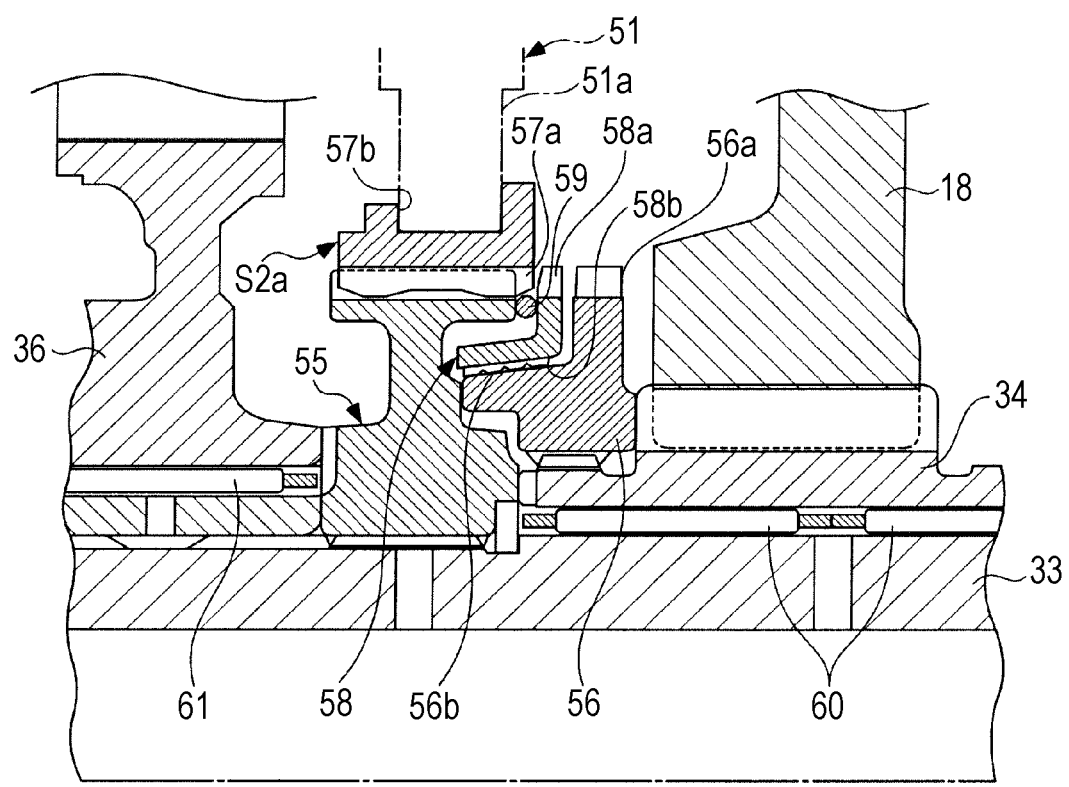
FIG. 3 is a sectional view illustrating a second-speed synchronizing mechanism and the structure around the second-speed synchronizing mechanism.

As illustrated in FIG. 3, the second-speed synchronizing mechanism S2 includes a hub 55 formed integrally with the second input sub-shaft 33, the sleeve S2a supported on the outer periphery of the hub 55, a dog tooth ring 56 integrated with the second-speed drive gear 34, a blocking ring 58 disposed between the sleeve S2a and the dog tooth ring 56, and a synchronizer spring 59 disposed between the sleeve S2a and the blocking ring 58. Each of these elements is ring-shaped and extends continuously in a circumferential direction.

The second-speed drive gear 34 is rotatably supported by the second input sub-shaft 33 with the needle bearing 60 interposed therebetween, and meshes with the second-speed/third-speed driven gear 18 as described above. Since the speed gear position is a low-speed gear position, the second-speed drive gear 34 has a relatively small diameter. Therefore, the inner diameter of the sleeve S2a is larger than the diameter of the second-speed drive gear 34, and the sleeve S2a faces the second-speed/third-speed driven gear 18 in the axial direction.

The hub 55 is splined to the second input sub-shaft 33 and rotates together with the second input sub-shaft 33. The above-described sixth-speed drive gear 36 is disposed adjacent to the hub 55 at the side opposite the second-speed drive gear 34. The sixth-speed drive gear 36 is rotatably supported by the second input sub-shaft 33 with a needle bearing 61 interposed therebetween.

The sleeve S2a has a plurality of spline teeth 57a on the inner peripheral surface thereof, and is splined to the outer periphery of the hub 55. Therefore, the sleeve S2a is not rotatable with respect to the hub 55 but is slidable in the axial direction of the second input sub-shaft 33. An annular groove 57b is formed in the outer peripheral surface of the sleeve S2a, and the first shift fork 51a of the shift rail 51 is fitted to the annular groove 57b.

The dog tooth ring 56 is splined to the second-speed drive gear 34 and rotates together with the second-speed drive gear 34. A plurality of dog teeth 56a, which are capable of meshing with the spline teeth 57a of the sleeve S2a, are formed on the outer peripheral surface of the dog tooth ring 56. An inner portion of the dog tooth ring 56 extends toward the hub 55, and the outer peripheral surface of the inner portion is formed as a conical surface 56b whose diameter gradually decreases toward the hub 55.

The blocking ring 58 has an L-shaped cross section and includes a plurality of spline teeth 58a, which are capable of meshing with the spline teeth 57a of the sleeve S2a, on the outer peripheral surface thereof. The inner peripheral surface of a portion of the blocking ring 58 that extends toward the hub 55 is formed as a conical surface 58b having a shape complementary to the shape of the conical surface 56b of the dog tooth ring 56. The blocking ring 58 is fitted to the dog tooth ring 56 at the conical surfaces 58b and 56b.

Figure 5:
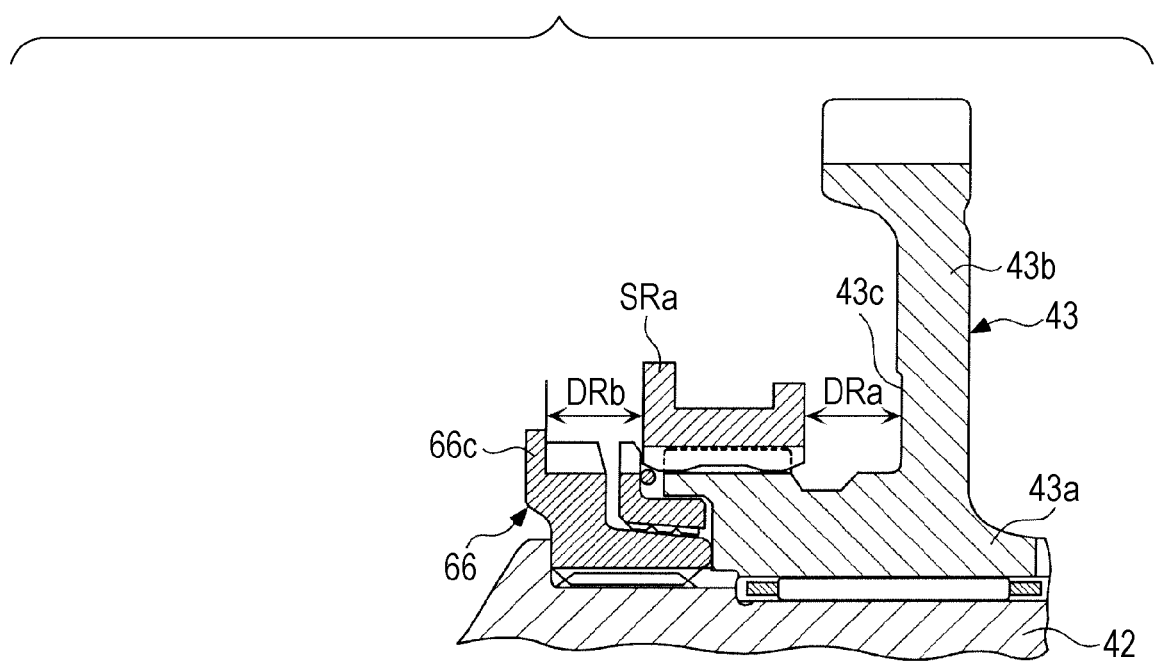
FIG. 5 is a sectional view of the second-speed synchronizing mechanism and the reverse synchronizing mechanism that are not operated.
Figure 5:
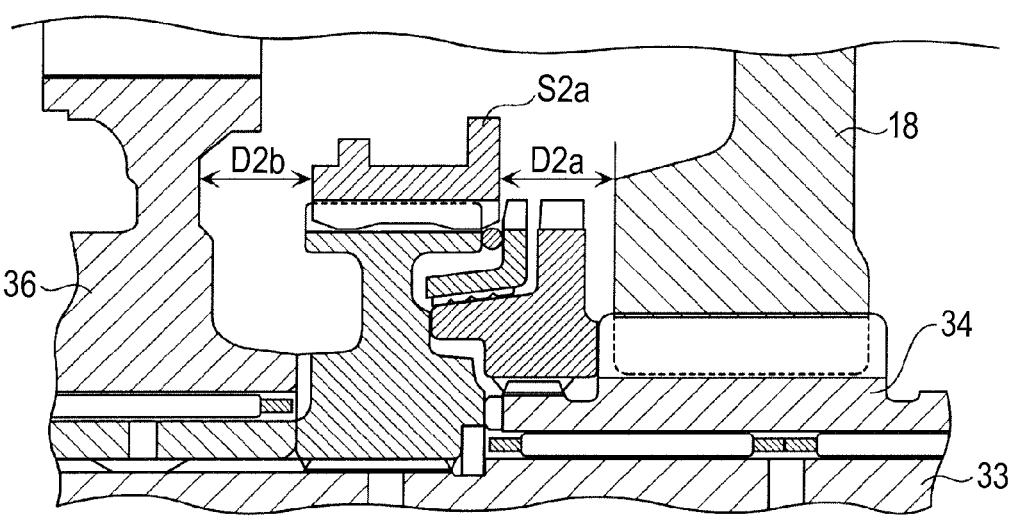
Figure 6:
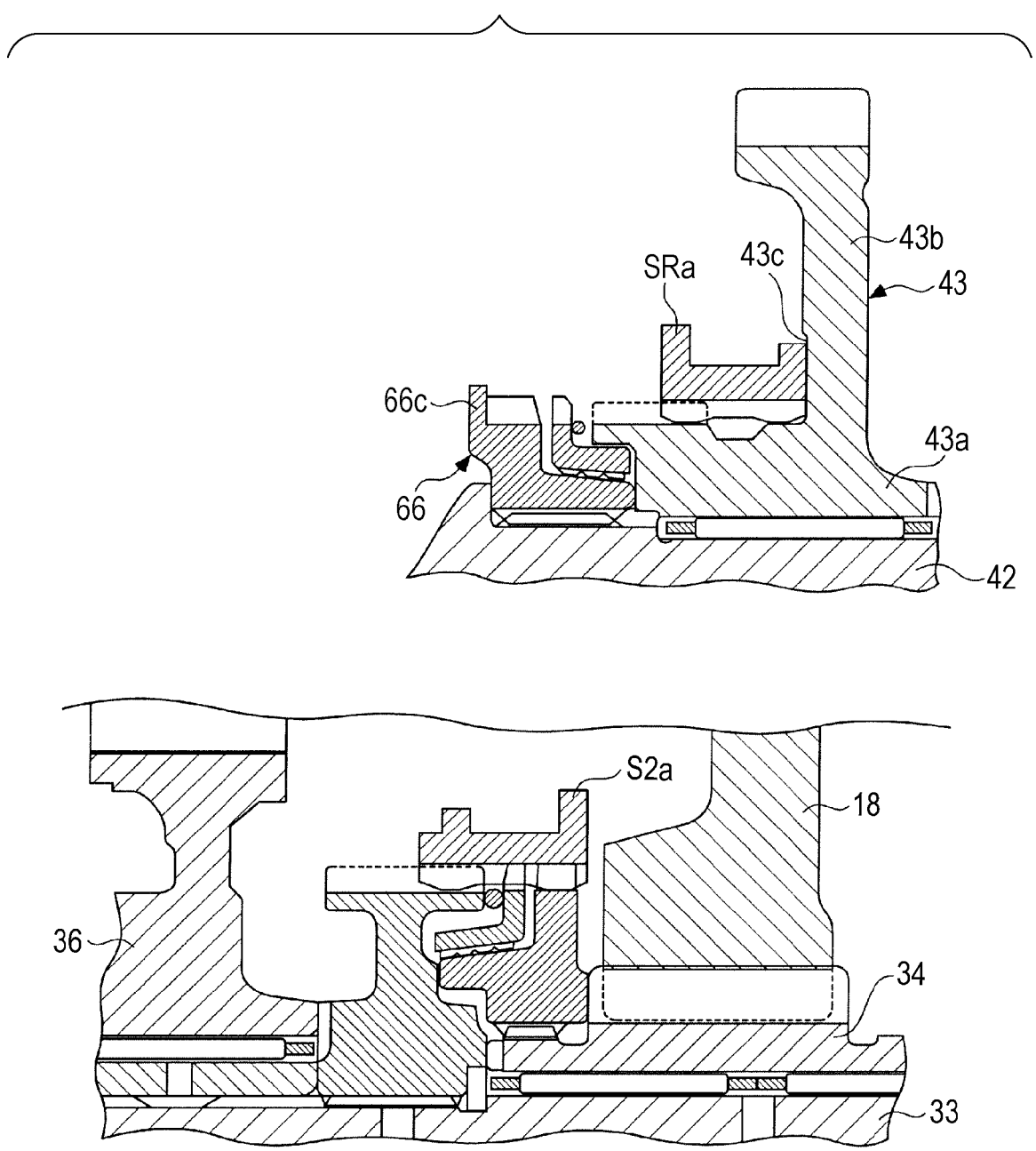
FIG. 6 is a sectional view of the second-speed synchronizing mechanism and the reverse synchronizing mechanism in the state in which the second-speed synchronizing mechanism is in a synchronized state.

The operation of the second-speed synchronizing mechanism S2 having the above-described structure will now be described with reference to FIGS. 3, 5, and 6. When the shift rail 51 is at the neutral position and the second-speed synchronizing mechanism S2 is not operated, the sleeve S2a is at a standby position illustrated in FIGS. 3 and 5. As illustrated in FIG. 5, in this state, the distance between the sleeve S2a and the second-speed/third-speed driven gear 18 is D2a, and the distance between the sleeve S2a and the sixth-speed drive gear 36 is D2b.

When the second-speed drive gear 34 is to be synchronized with the second input sub-shaft 33 from this state, the shift rail 51 is moved rightward in FIG. 3 by the actuator. Accordingly, the sleeve S2a is moved rightward from the standby position by the first shift fork 51a, and pushes the blocking ring 58. As a result, the blocking ring 58 is also moved rightward, and the conical surface 58b of the blocking ring 58 comes into contact with the conical surface 56b of the dog tooth ring 56, so that a frictional force is generated between the conical surfaces 58b and 56b.

When the sleeve S2a is further moved, the frictional force applied between the conical surfaces 58b and 56b increases, so that the second-speed drive gear 34 starts to rotate together with the sleeve S2a. Thus, the second-speed drive gear 34 is synchronized with the second input sub-shaft 33. In this state, the spline teeth 57a of the sleeve S2a mesh with the spline teeth 58a of the blocking ring 58, and then with the dog teeth 56a of the dog tooth ring 56. As a result, the second-speed drive gear 34 and the second input sub-shaft 33 are integrally connected to each other and the speed gear position is set.

When the sleeve S2a is further moved, owing to the first positional relationship, which will be described below, the sleeve SRa of the reverse synchronizing mechanism SR comes into contact with a side surface of the reverse drive gear 43 (see FIG. 6) before the sleeve S2a comes into contact with the second-speed/third-speed driven gear 18. Accordingly, the shift rail 51 is stopped and the sleeve S2a stops moving. As a result, the sleeve S2a does not leave the hub 55 or come into contact with the second-speed/third-speed driven gear 18.

Next, the structure of the reverse synchronizing mechanism SR will be described with reference to FIG. 4. The reverse synchronizing mechanism SR includes the sleeve SRa supported by the reverse drive gear 43, a dog tooth ring 66 integrated with the reverse shaft 42, a blocking ring 68 disposed between the sleeve SRa and the dog tooth ring 66, and a synchronizer spring 69 disposed between the sleeve SRa and the blocking ring 68. Each of these elements is ring-shaped and extends continuously in a circumferential direction.

The reverse drive gear 43 is rotatably supported by the reverse shaft 42 with a needle bearing 70 interposed therebetween. The reverse drive gear 43 includes a base portion 43a that is attached to the reverse shaft 42 and extends in the axial direction of the reverse shaft 42 and a main portion 43b that extends radially outward from a rear end of the base portion 43a.

The sleeve SRa has a plurality of spline teeth 67a on the inner peripheral surface thereof, and is splined to the outer periphery of the base portion 43a of the reverse drive gear 43. Therefore, the sleeve SRa is not rotatable with respect to the reverse drive gear 43 but is slidable in the axial direction of the reverse shaft 42. An annular groove 67b is formed in the outer peripheral surface of the sleeve SRa, and the second shift fork 51b of the shift rail 51 is fitted to the annular groove 67b.

The dog tooth ring 66 is splined to the reverse shaft 42 and rotates together with the reverse shaft 42. A plurality of dog teeth 66a, which are capable of meshing with the spline teeth 67a of the sleeve SRa, are formed on the outer peripheral surface of the dog tooth ring 66. A stopper 66c is formed integrally with an outer peripheral portion of the dog tooth ring 66 at an end opposite the reverse drive gear 43. The stopper 66c is located adjacent to the dog teeth 66a and projects outward. An inner portion of the dog tooth ring 66 extends toward the reverse drive gear 43, and the outer peripheral surface of the inner portion is formed as a conical surface 66b whose diameter gradually decreases toward the reverse drive gear 43.

The blocking ring 68 has an L-shaped cross section and includes a plurality of spline teeth 68a, which are capable of meshing with the spline teeth 67a of the sleeve SRa, on the outer peripheral surface thereof. The inner peripheral surface of a portion of the blocking ring 68 that extends toward the reverse drive gear 43 is formed as a conical surface 68b having a shape complementary to the shape of the conical surface 66b of the dog tooth ring 66. The blocking ring 68 is fitted to the dog tooth ring 66 at the conical surfaces 68b and 66b.

Figure 7:
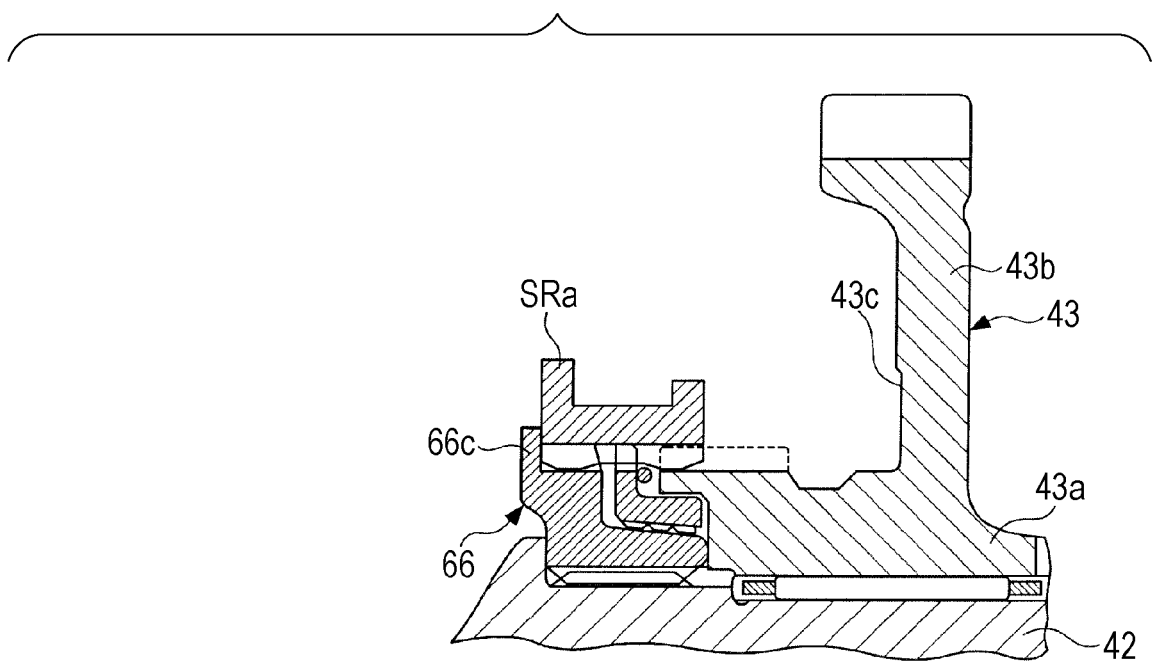
FIG. 7 is a sectional view of the second-speed synchronizing mechanism and the reverse synchronizing mechanism in the state in which the reverse synchronizing mechanism is in a synchronized state.
Figure 7:
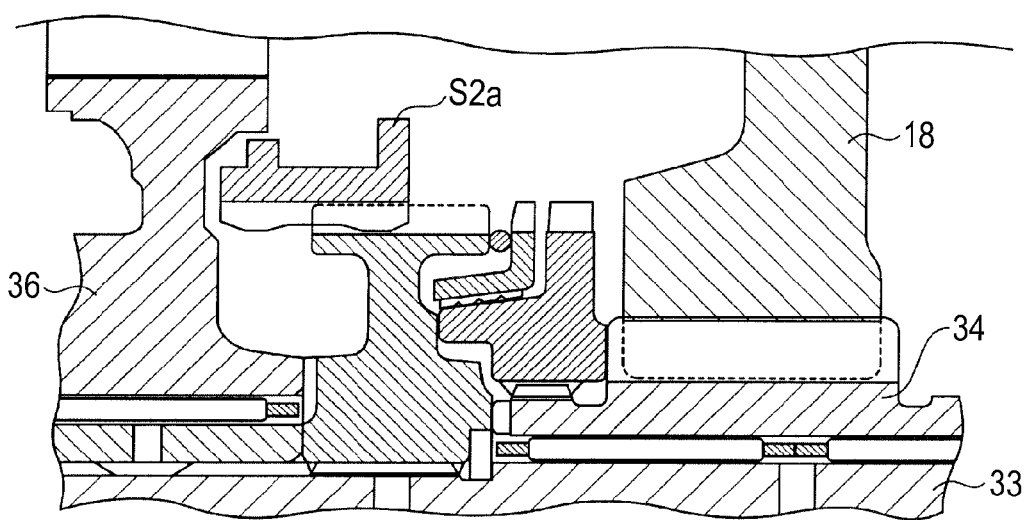

The operation of the reverse synchronizing mechanism SR having the above-described structure will now be described with reference to FIGS. 4, 5, and 7. When the shift rail 51 is at the neutral position and the reverse synchronizing mechanism SR is not operated, the sleeve SRa is at a standby position illustrated in FIGS. 4 and 5. Referring to FIG. 5, in this state, the distance between the sleeve SRa and a side surface 43c of the main portion 43b of the reverse drive gear 43 is DRa, which is smaller than the distance D2a between the sleeve S2a and the second-speed/third-speed driven gear 18. This relationship is hereinafter referred to as a "first positional relationship". The distance between the sleeve SRa at the standby position and the stopper 66c of the dog tooth ring 66 is DRb, which is smaller than the distance D2b between the sleeve S2a and the sixth-speed drive gear 36. This relationship is hereinafter referred to as a "second positional relationship".

Figure 4:
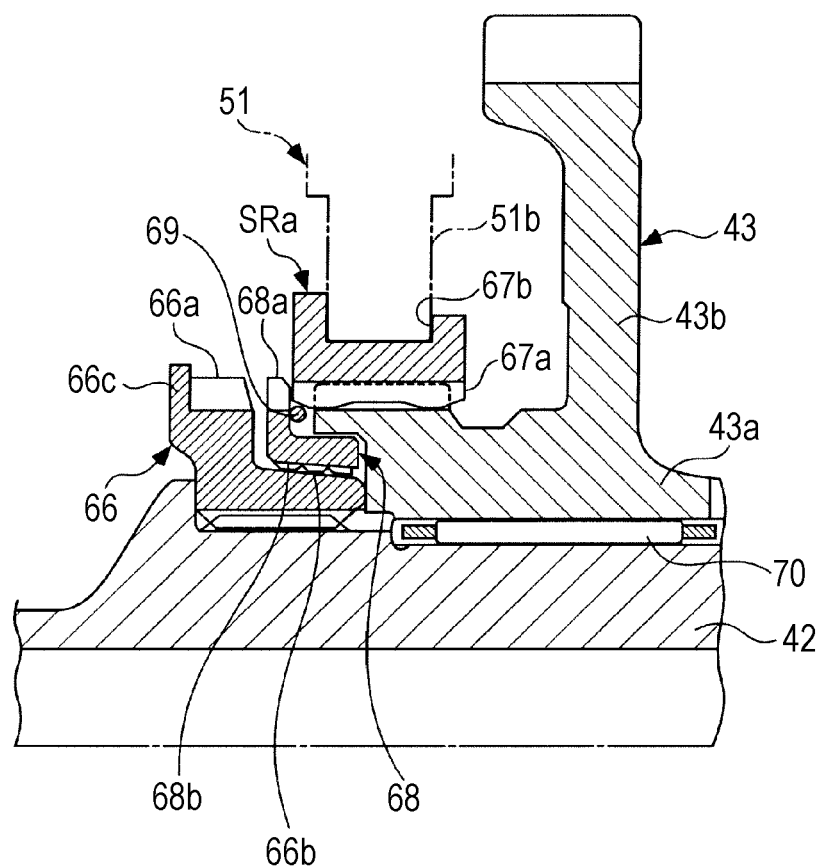
FIG. 4 is a sectional view illustrating a reverse synchronizing mechanism and the structure around the reverse synchronizing mechanism.

When the reverse drive gear 43 is to be synchronized with the reverse shaft 42 from this state, the shift rail 51 is moved leftward in FIG. 4 by the actuator. Accordingly, the sleeve SRa is moved leftward by from the standby position by the second shift fork 51b, and pushes the blocking ring 68. As a result, the blocking ring 68 is also moved leftward, and the conical surface 68b of the blocking ring 68 comes into contact with the conical surface 66b of the dog tooth ring 66, so that a frictional force is generated between the conical surfaces 68b and 66b.

When the sleeve SRa is further moved, the frictional force applied between the conical surfaces 68b and 66b increases, so that the sleeve SRa starts to rotate together with the dog tooth ring 66. Thus, the reverse drive gear 43 is synchronized with the reverse shaft 42. In this state, the spline teeth 67a of the sleeve SRa mesh with the spline teeth 68a of the blocking ring 68, and then with the dog teeth 66a of the dog tooth ring 66. As a result, the reverse drive gear 43 and the reverse shaft 42 are integrally connected to each other.

When the sleeve SRa is further moved, owing to the above-described second positional relationship, the sleeve SRa comes into contact with the stopper 66c of the dog tooth ring 66 (see FIG. 7) before the sleeve S2a of the second-speed synchronizing mechanism S2 comes into contact with the sixth-speed drive gear 36. Accordingly, the shift rail 51 is stopped and the sleeve S2a stops moving. As a result, the sleeve S2a does not come into contact with the sixth-speed drive gear 36.

As described above, according to the present embodiment, the second-speed synchronizing mechanism S2 and the reverse synchronizing mechanism SR perform the synchronizing operations by moving the sleeves S2a and SRa thereof, which are connected to the same shift rail 51, in the opposite directions by using the shift rail 51. The distance DRa between the reverse-side sleeve SRa at the standby position and the side surface 43c of the reverse drive gear 43 is smaller than the distance D2a between the second-speed-side sleeve S2a and the second-speed/third-speed driven gear 18 (first positional relationship).

Owing to the first positional relationship, when the second-speed synchronizing mechanism S2 performs the synchronizing operation, the reverse-side sleeve SRa comes into contact with the side surface 43c of the reverse drive gear 43 before the second-speed-side sleeve S2a comes into contact with the second-speed/third-speed driven gear 18. Thus, the shift rail 51 and the sleeve S2a are stopped, and the sleeve S2a is reliably prevented from being released from the hub 55 or coming into contact with the second-speed/third-speed driven gear 18.

The distance DRb between the reverse-side sleeve SRa at the standby position and the dog tooth ring 66c is smaller than the distance D2b between the second-speed-side sleeve S2a and the sixth-speed drive gear 36 (second positional relationship). Owing to the second positional relationship, when the reverse synchronizing mechanism SR performs the synchronizing operation, the reverse-side sleeve SRa comes into contact with the stopper 66c before the second-speed-side sleeve S2a comes into contact with the sixth-speed drive gear 36. Thus, the shift rail 51 and the sleeve S2a are stopped, and the sleeve S2a is reliably prevented from coming into contact with the sixth-speed drive gear 36.

As described above, the sleeve S2a can be prevented from coming into contact with the second-speed/third-speed driven gear 18 or the sixth-speed drive gear 36 without providing the second-speed synchronizing mechanism S2 with a stopper for regulating the movement of the sleeve S2a. Since no stopper is necessary in the second-speed synchronizing mechanism S2, the number of components and the number of assembly steps can be reduced. As a result, the cost of the synchronizer can be reduced. In addition, the axial length of the synchronizer can be reduced, so that the size of the transmission 4 can be reduced.

In addition, since the reverse-side sleeve SRa is non-rotatably attached to the reverse drive gear 43, no differential rotation occurs between the reverse-side sleeve SRa and the reverse drive gear 43. Therefore, the sleeve SRa and the reverse drive gear 43 come into contact with each other without causing contact portions thereof to wear unevenly or be damaged owing to a differential rotation therebetween. In addition, since the side surface 43c of the reverse drive gear 43 is used as the stopper, it is not necessary to perform a special process or attach an additional member to obtain the stopper function. Since no stopper is necessary, advantages such as reductions in cost and size of the transmission can be substantially achieved.

The present disclosure is not limited to the above-described embodiment, and various modifications are possible. For example, in the above-described embodiment, the present disclosure is applied to the second-speed synchronizing mechanism S2 and the reverse synchronizing mechanism SR provided on the second input sub-shaft 33 and the reverse shaft 42, respectively, arranged on different axial lines. The present disclosure is not limited to this, and may instead be applied to two synchronizing mechanisms arranged on the same axial line as long as the sleeves are moved in opposite directions in the synchronizing operations thereof. In addition, the combination of the gear positions is not limited to the second and reverse gear positions as in the above-described embodiment, and may instead by any combination.

The structures of the second-speed synchronizing mechanism S2 and the reverse synchronizing mechanism SR described in the above-described embodiment are merely examples, and other structures may, of course, instead be used. Other detailed structures may also be changed as appropriate within the scope of the present disclosure.

According to a first aspect of the embodiment, a synchronizer for a transmission 4 synchronizes one of a plurality of gears with a rotating shaft (second input sub-shaft 33 and reverse shaft 42 according to the embodiment (hereinafter the same)) to set a gear position, the gears being rotatably supported by the rotating shaft and including a first gear (second-speed drive gear 34) and a second gear (reverse drive gear 43). The synchronizer includes a shift rail 51, a first sleeve (sleeve S2a), a second sleeve (sleeve SRa), and a stopper (side surface 43c of reverse drive gear 43 and stopper 66c). The shift rail 51 includes a first shift fork 51a and a second shift fork 51b that are integrated with each other and is movable in an axial direction of the rotating shaft. The first sleeve engages with the first shift fork 51a, is driven by the shift rail 51 through the first shift fork 51a, and synchronizes the first gear with the rotating shaft by moving in a first direction along the axial direction from a predetermined first standby position. The second sleeve engages with the second shift fork 51b, is driven by the shift rail 51 through the second shift fork 51b, and synchronizes the second gear with the rotating shaft by moving in a second direction, which is opposite to the first direction, along the axial direction from a predetermined second standby position. The stopper regulates the movement of the second sleeve by coming into contact with the second sleeve. The gears further include a third gear (second-speed/third-speed driven gear 18 and sixth-speed drive gear 36) arranged to face the first sleeve in the axial direction, and a distance (DRa, DRb) between the second sleeve at the second standby position and the stopper is smaller than a distance (D2a, D2b) between the first sleeve at the first standby position and the third gear.

With this structure of the embodiment, the shift rail includes the first and second shift forks that respectively engage with the first and second sleeves and that are integrated with each other. Therefore, when the shift rail is moved, the first and second sleeves are moved in the same direction by the same distance. When the shift rail is moved in the first direction along the axial direction of the rotating shaft, the first sleeve is driven by the first shift fork in the first direction from the predetermined first standby position. Accordingly, the first gear is synchronized with the rotating shaft and the gear position is set to the speed gear position.

When the shift rail is moved in the second direction, which is opposite to the first direction, along the axial direction of the rotating shaft, the second sleeve is driven by the second shift fork in the second direction from the predetermined second standby position. Accordingly, the second gear is synchronized with the rotating shaft and the gear position is set to the speed gear position.

The second sleeve is provided with the stopper, and when the second sleeve moves and comes into contact with the stopper, the second sleeve stops moving. The third gear is arranged so as to face the first sleeve in the axial direction, and the distance between the first sleeve at the first standby position and the third gear is smaller than the distance between the second sleeve at the second standby position and the stopper.

Owing to the above-described positional relationship and the fact that the first and second sleeves are moved in the same direction by the same distance, when the first sleeve is moved toward the third gear from the first standby position, the second sleeve comes into contact with the stopper before the first sleeve comes into contact with the third gear. Accordingly, the shift rail and the first sleeve stop moving, and the third gear and the first sleeve are reliably prevented from coming into contact with each other. Therefore, no stopper is necessary for the first sleeve, and the number of components and the number of assembly steps can be reduced. As a result, the cost of the synchronizer can be reduced. In addition, the axial length of the synchronizer can be reduced, so that the size of the transmission can be reduced.

In the above-described synchronizer for a transmission, the rotating shaft may include an input shaft (second input sub-shaft 33) and an intermediate shaft (reverse shaft 42) that is parallel to the input shaft. The first gear and the first sleeve may be arranged on the input shaft and the second gear, and the second sleeve may be arranged on the intermediate shaft.

With this structure of the embodiment, the above-described effects can be provided in the structure in which the first gear and the first sleeve are arranged on the input shaft, and the second gear and the second sleeve are arranged on the intermediate shaft, which is parallel to the input shaft.

In the above-described synchronizer for a transmission, the second gear (reverse drive gear 43) may include a base portion 43a attached to the rotating shaft (reverse shaft 42) and a main portion 43b that extends radially outward from the base portion 43a. The second sleeve (sleeve SRa) may be attached to the base portion 43a of the second gear such that the second sleeve is not rotatable with respect to the base portion 43a but is movable in the axial direction, and the stopper may be formed of a side surface 43c of the main portion 43b of the second gear.

With this structure of the embodiment, the second sleeve moves in the axial direction above the base portion of the second gear, and stops moving when the second sleeve comes into contact with the side surface of the main portion of the second gear. Since the second sleeve is non-rotatably attached to the base portion of the second gear, no differential rotation occurs between the second sleeve and the second gear. Therefore, the second sleeve and the second gear come into contact with each other without causing contact portions thereof to wear unevenly or be damaged owing to a differential rotation therebetween. In addition, since the side surface of the main portion of the second gear is used as the stopper, it is not necessary to perform a special process or attach an additional member to obtain the stopper function. Since no stopper is necessary, advantages such as reductions in cost and size of the transmission can be substantially achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A synchronizer for a transmission, comprising:
a shift rail including a first shift fork and a second shift fork that are provided integrally with each other, the shift rail being movable in an axial direction of a rotating shaft supporting a first gear, a second gear, and a third gear to be rotatable with respect to the rotating shaft;
a first sleeve engaging with the first shift fork to be driven by the shift rail through the first shift fork, the first sleeve being movable in a first direction along the axial direction from a predetermined first standby position to synchronize the first gear with the rotating shaft, the first sleeve being arranged to face the third gear in the axial direction;
a second sleeve engaging with the second shift fork to be driven by the shift rail through the second shift fork, the second sleeve being movable in a second direction along the axial direction from a predetermined second standby position to synchronize the second gear with the rotating shaft, the second direction being opposite to the first direction; and
a stopper contactable with the second sleeve to regulate movement of the second sleeve, a distance between the second sleeve at the predetermined second standby position and the stopper in the axial direction being smaller than a distance between the first sleeve at the predetermined first standby position and the third gear in the axial direction.

2. The synchronizer according to claim 1,
wherein the rotating shaft includes
an input shaft rotatable about a first rotation axis along the axial direction, and
an intermediate shaft rotatable about a second rotation axis along the axial direction,
wherein the first gear and the first sleeve are arranged on the input shaft, and
wherein the second gear and the second sleeve are arranged on the intermediate shaft.

3. The synchronizer according to claim 1,
wherein the second gear includes
a base portion attached to the rotating shaft, and
a main portion extending radially outward from the base portion,
wherein the second sleeve is attached to the base portion of the second gear to be rotatable integrally with the base portion and to be movable with respect to the base portion in the axial direction, and
wherein the stopper is provided on a side surface of the main portion of the second gear.

4. The synchronizer according to claim 1,
wherein the first sleeve includes a first axial end surface facing a side surface of the third gear in the axial direction,
wherein the second sleeve includes a second axial end surface facing a stopper surface of the stopper in the axial direction and contactable with the stopper surface, and
wherein a distance between the second axial end surface of the second sleeve at the predetermined second standby position and the stopper surface of the stopper in the axial direction is smaller than a distance between the first axial end surface of the first sleeve at the predetermined first standby position and the side surface of the third gear in the axial direction.

5. The synchronizer according to claim 4, wherein the first axial end surface of the first sleeve is spaced apart from the side surface of the third gear in the axial direction when the second axial end surface of the second sleeve is in contact with the stopper surface of the stopper.

* * * * *